US012485443B2

(12) United States Patent
Moretti

(10) Patent No.: US 12,485,443 B2
(45) Date of Patent: Dec. 2, 2025

(54) DEVICE FOR DISPENSING A FLUID SUBSTANCE

(71) Applicant: LUMSON S.p.A., Capergnanica (IT)

(72) Inventor: Matteo Moretti, Crema (IT)

(73) Assignee: LUMSON S.p.A., Capergnanica (IT)

( * ) Notice: Subject to any disclaimer, the term of this patent is extended or adjusted under 35 U.S.C. 154(b) by 231 days.

(21) Appl. No.: 18/214,804

(22) Filed: Jun. 27, 2023

(65) Prior Publication Data

US 2024/0001388 A1 Jan. 4, 2024

(30) Foreign Application Priority Data

Jun. 29, 2022 (IT) ........................ 102022000013717

(51) Int. Cl.
*B05B 11/00* (2023.01)
*B05B 11/10* (2023.01)

(52) U.S. Cl.
CPC ...... *B05B 11/1059* (2023.01); *B05B 11/1047* (2023.01); *B05B 11/1052* (2023.01)

(58) Field of Classification Search
CPC ............. B05B 11/1059; B05B 11/1047; B05B 11/1052; B05B 11/026
See application file for complete search history.

(56) References Cited

U.S. PATENT DOCUMENTS 5,772,080 A 6/1998 de Pous et al.
8,490,837 B2 * 7/2013 Michaux ................ B65D 83/22 222/321.9
8,695,852 B2 * 4/2014 Bertin ................. B05B 11/0032 222/402.11
2008/0023498 A1 1/2008 Bertin et al.
2015/0108171 A1 4/2015 Kim
2023/0001435 A1 * 1/2023 Chapelier ........... B05B 11/1047

FOREIGN PATENT DOCUMENTS

WO 2021111070 A1 6/2021

* cited by examiner

*Primary Examiner* — Vishal Pancholi
(74) *Attorney, Agent, or Firm* — Dickinson Wright PLLC; Andrew D. Dorisio

(57) ABSTRACT

A device for dispensing a fluid substance includes an external container with a collar fixed to an intermediate element, and first torsional alignment means between the intermediate element and the collar, the intermediate element featuring an opening cooperating with a flange of a pump for fixing the pump to the collar, the pump featuring a stem coupled in a sealed manner to a dispensing button rotatably coupled to the intermediate element for moving between a first locking position, in which at least one stop on the button abuts a surface of the intermediate element to prevent axial translation of the button, and a dispensing position which permits an axial movement of the button, and a ring nut for moving the button torsionally coupled to the button, the ring nut concealing at least part of a lateral surface of the the button and the intermediate element.

13 Claims, 4 Drawing Sheets

DEVICE FOR DISPENSING A FLUID SUBSTANCE

FIELD OF THE INVENTION

The present invention relates to a fluid substance dispensing device.

In particular, the invention refers to a dispensing device for a substance used in the cosmetic or medical field such as a cream, a foundation, etc.

BACKGROUND ART

Fluid substances used in the cosmetic or medical field are usually marketed in containers equipped with manual pumps which allow the product to be dispensed.

In particularly exacting contexts, consumers are attracted by the aesthetics and the functionality of the container in which these substances are marketed.

The containers according to prior art are normally disposable and therefore must have an acceptable marketing cost.

The final cost of a container results from a combination of various items, among which the assembly costs stand out in particular, in addition to the quality of the materials of which they are made.

Another very important item to take into consideration is the generation of rejects, which if high in number, affects the end price of the product.

Especially in the case of containers with glass parts, for example blown glass, where tolerances are difficult to control, most rejects originate not from the container having 'functioning' problems but from assembly or visual defects, misalignment of printed parts or parts in relief, or obvious misalignments resulting from a 'final' position of mutually coupled parts which is not aesthetically pleasing.

US2008/023498 A1 and WO2021/111070 A1 disclose devices for dispensing fluid known in the art.

SUMMARY OF THE INVENTION

The object of the present invention is to provide a device for dispensing a fluid substance which is improved compared with the prior art.

A further object of the invention is to provide a device which can be assembled more easily than the devices according to prior art, thus generating less waste due to aesthetic defects.

This and other objects are achieved by means of a device produced according to the technical teachings of the claims annexed hereto.

BRIEF DESCRIPTION OF THE FIGURES

Further features and advantages of the innovation will become clearer in the description of a preferred but not exclusive embodiment of the device for dispensing a fluid substance, illustrated—by way of a non-limiting example—in the drawings annexed hereto, in which.

DETAILED DESCRIPTION OF THE INVENTION

With reference to the figures stated, reference number 1 is used to denote, as a whole, a device for dispensing a fluid substance.

In this document, the term 'fluid substance' means a liquid or relatively dense substance which can be dispensed via a manually operated pump P. The fluid substance can be of a cosmetic, medical, etc. type.

By way of example, the device can be a cream, a liquid for make-up, etc.

Figure 12:
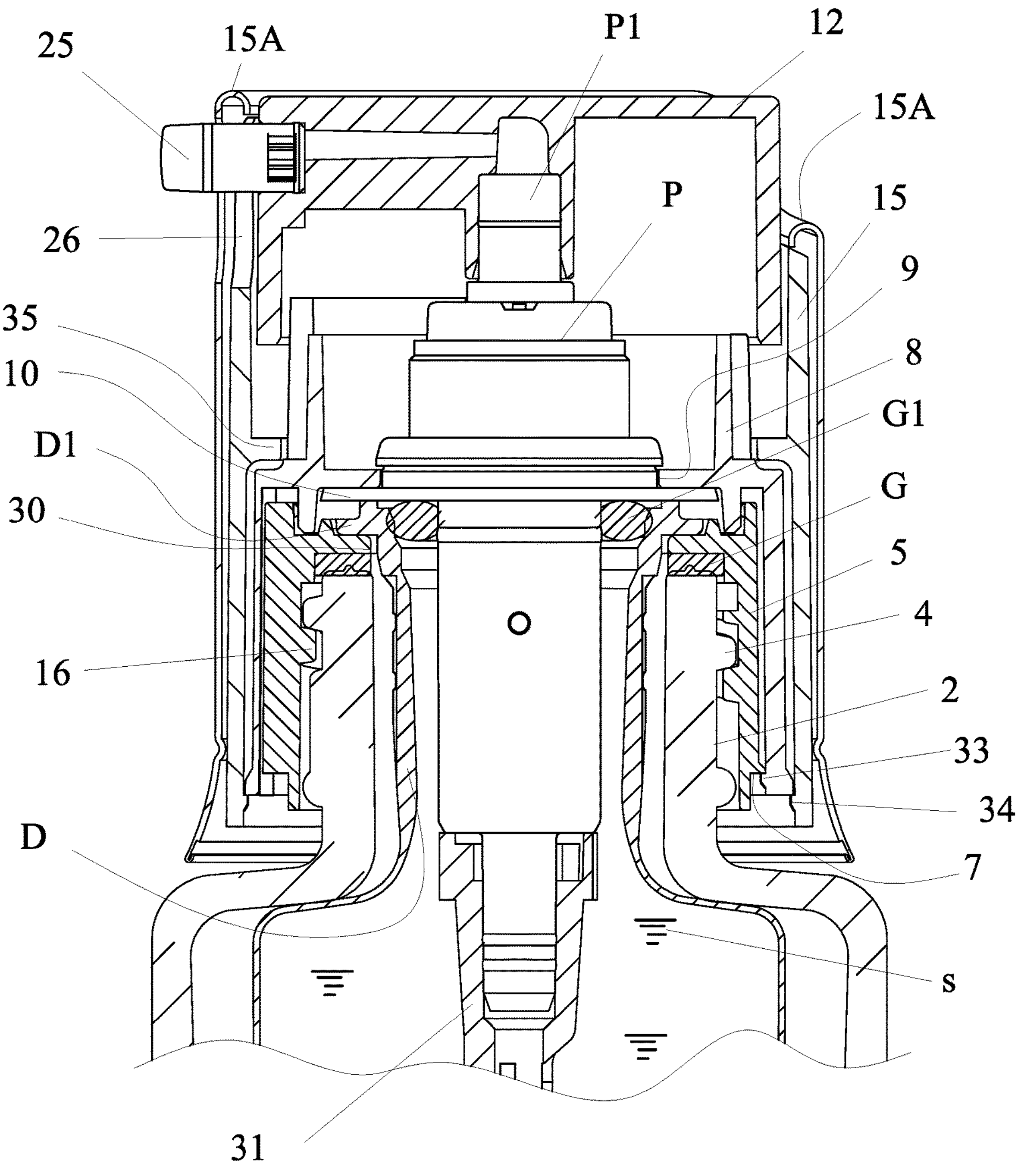
FIG. 12 is a section view taken along line XII-XII in FIG. 1.

The device 1 comprises an external container 2 endowed with a collar 5 and an intermediate element 8 fixed, for example by means of snap-fitting or an undercut, to the collar (see FIG. 12).

The external container 2 can be made of glass or plastic, and can have a neck 3 endowed with a thread 4.

The collar 5 can feature a counter-thread 16; the thread 4 and the counter-thread 16 can be configured so as to provide a screwing limit (or stroke limit) position which is essentially a "snap-fit" arrangement which determines a sole, centred alignment between the collar 5 and the external container 2.

The sole alignment between the collar 5 and the container 2 can be very useful, for example in the event that the footprint of the container is not circular, or in the event that, even in the presence of a circular footprint, the said container features lettering or designs in relief, or various decorations (including printed decorations) which are preferably perfectly positioned according to the nozzle of a pump P which will be coupled to the container.

The system described above is also effective to prevent (accidental or intentional) unscrewing.

Figure 6:
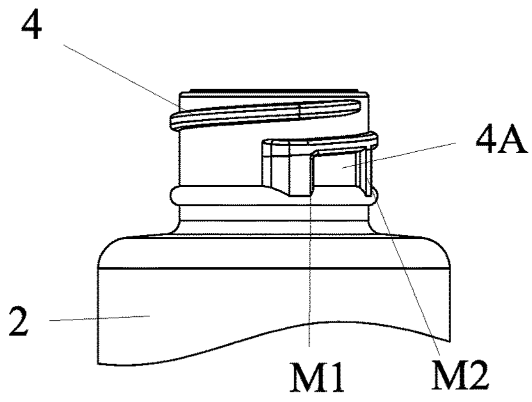
FIG. 6 is a side view of a detail of the invention.
Figure 7:
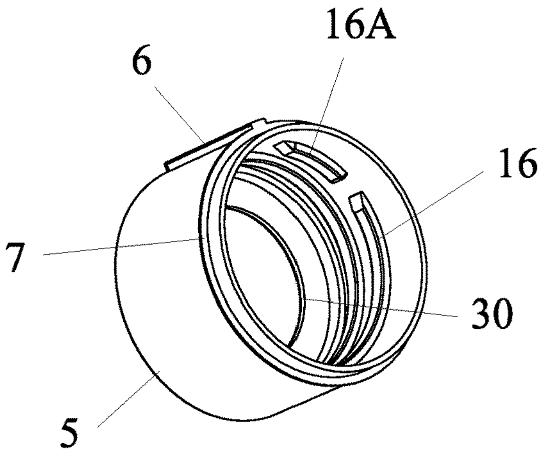
FIGS. 7 to 11 are perspective views of various parts of the device in FIG. 1.

For example, the thread 4 and the counter-thread 16 may be single thread arrangements. As can be seen in FIGS. 6 and 7, one of either the said counter-thread 16 or the said thread 4 can feature an isolated portion 16A of the thread (essentially a part of the thread which is separate from the rest of the thread) which determines the said stroke limit or alignment position when the said portion is inserted into a seat 4A made in the other either said thread 4 or counter-thread 16.

Figure 3:
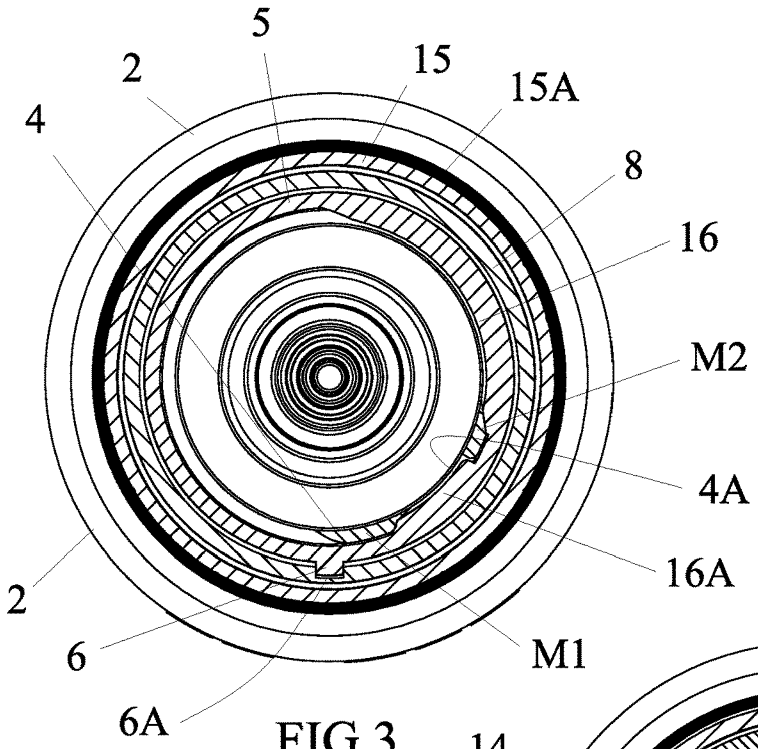
FIG. 3 is a section taken along line III-III in FIG. 2.

For example, the seat 4A, which is clearly visible in FIG. 6, can be formed of two uprights M1, M2 which extend in an essentially axial direction underneath the thread 4, in practice creating the seat 4A configured to house the insulated portion of the thread 16A (see for example FIG. 3).

The upright M1 prevents over-screwing, while the upright M2 prevents the collar 5 unscrewing.

According to the invention, the container 2 is a separate piece with respect to the collar 5; in this case, a deformable element G can be envisaged (which can also be simply a gasket, as shown) placed between the collar 5 and the container 2, as visible in FIG. 12. The deformable element F can be, for example, made of NBR or LDPE or PP, and can be provided for the purpose of recovering and absorbing the 'height' tolerances between the collar 5 and the container 2 (when made of glass, for example, as mentioned earlier).

Between the intermediate element 8 and the collar 5 there are first torsional alignment means 6, 6A present to ensure univocal positioning of the intermediate element with respect to the collar (and therefore to the container 2 given that the collar 5 is positioned according to the said container 2).

Figure 8:
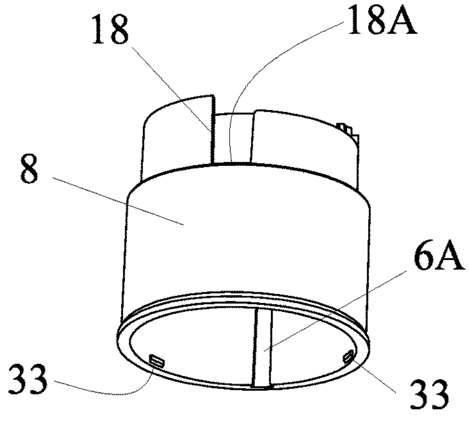

The first torsional alignment means can also be of a very simple type, for example—as illustrated in FIGS. 7 and 8—a protuberance 6 with axial extension (i.e. parallel to an axis A of the device 1) which fits into a suitable seat 6A. In this way the intermediate element 8 is positioned according to both the collar 5 and the container 2.

Obviously, the first alignment means 6, 6A can be made in other ways useful for the purpose of carrying out the required alignment, in an unambiguous way.

The intermediate element 8 can be snap-fitted onto the collar 5. To make the coupling, the collar can envisage a step 7 (or a free edge, for example, with a corner) which cooperates with undercut means envisaged on the intermediate element, for example teeth 33 (FIGS. 8 and 12).

Figure 9:
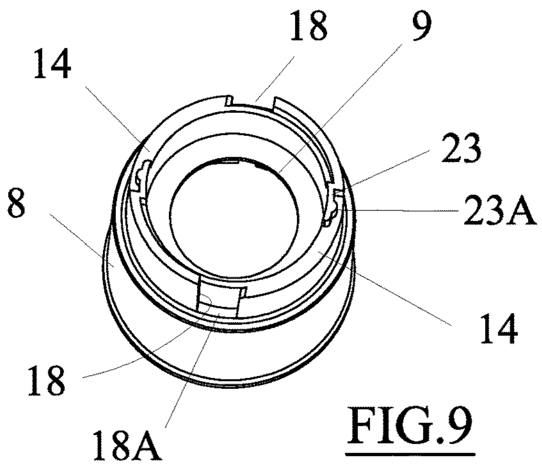

In FIGS. 9 and 12, it can be seen that the intermediate element 8 features a (for example circular) opening 9, which cooperates with a flange 10 of a pump P for fixing the pump to the collar 5.

More specifically, the collar 5 can also feature an opening 30 therein, through which a deformable bag D can be inserted. The deformable bag D (inserted inside the container 2) can feature a flange D1, for example which rests on the collar 5 in a suitable seat.

The pump flange 10 and the bag flange D1 can be sandwiched between the collar 5 and the intermediate element 8, as shown in FIG. 12.

A gasket G2, for example an O-ring, can be envisaged between the bag D and the pump P (or rather the pump body, below the flange 10).

The pump P can feature an elongated element 31, which extends inside the bag D and guides the deformation thereof following expulsion of the fluid substance S.

Also in FIG. 12, it can be seen that the pump P has a hollow stem P1 coupled, in a sealed manner, to a dispensing button 12.

The button 12 can feature a cylindrical seat which couples in a sealed manner to the said stem P1.

The dispensing button 12 is coupled in a rotating manner to the intermediate element 8 so as to be able to move between a first lock position (FIGS. 1 and 4), in which at least one stop 13 of the button 12 abuts a surface 14 of the intermediate element 8, to prevent an axial translation of the button 12.

The button 12 also has a dispensing position (shown in FIGS. 2 and 5, for example rotated by 90° with respect to the intermediate element 8 with respect to the position in FIG. 1), in which an axial movement of the button 12 is allowed in order to dispense the fluid substance S contained in the external container 2 (inside the bag D obviously, which is optional).

The device 1 also comprises a ring nut 15 for moving the button 12, the said ring nut being torsionally coupled to the said button 12; the ring nut 15 (possibly together with a coating or covering 15A thereof) is configured so as to hide from view, at least part of a lateral surface of the said button 12 and of the said intermediate element 8.

Advantageously, however, the ring nut 15 leaves the top of the button 12 totally accessible.

The ring nut 15 is torsionally coupled to the button 12, for example by means of at least a further axial rib 21 which cooperates with at least one axial recess 22 in the button.

In practice, a rotation of the ring nut 15 also causes a rotation of the button 12 to move the said button between the locked position thereof and the activation position thereof (or vice versa).

The ring nut 15 can be snap-fitted to the intermediate element 8 but always in such a way that the said ring nut is rotatably mounted on the intermediate element 8, which can act as a guide for the rotation thereof. For this purpose, the coupling can be achieved by means of further teeth 34 (or a continuous edge, however undercut) which cooperate with a free edge (for example with a corner) of the intermediate element 8.

Since the ring nut 15 is configured to rotate (around the axis A) on top of the intermediate element, the said ring nut features a resting surface 35 for resting on top of the intermediate element 8.

The resting surface 35 is kept apart by the further teeth 34, which allows no—or only minimal—translation of the ring nut 15 (along the axis A).

The ring nut 15 can feature a covering 15A made of a metallic material (for example, aluminium) or with a metallic finish, which renders the said ring nut very aesthetically pleasing, lending the device distinction. For example, the covering can be fitted onto the ring nut 15 and secured by interference fit.

Advantageously, the dispensing button 12 features a protruding nozzle 25 and, consequently, the ring nut 15 (and the covering 15A) features a window 26 inside which the said nozzle 25 is positioned. In practice, the window completely surrounds the nozzle and can be elongated in an axial direction so as to allow translation of the nozzle 25 following operation of the button 12.

Figure 11:
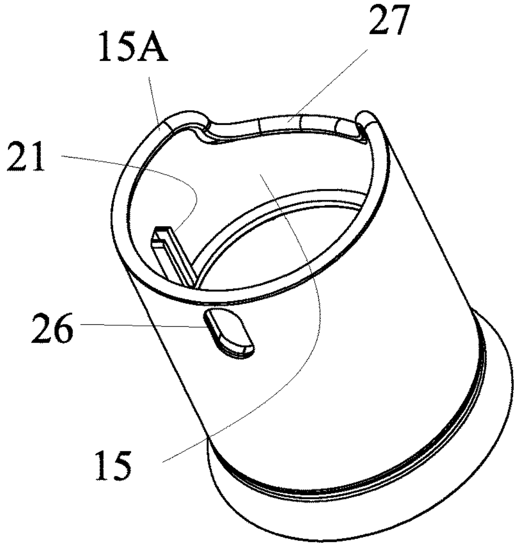

Furthermore, in FIG. 11 for example, it can be seen that the ring nut 15 (or the covering 15A) features a free end endowed with a lowered portion 27 which makes a lateral part of the said button 12 (located in a diametrically opposite position with respect to the nozzle) accessible.

Returning to the description of the coupling (useful for the creation of an ON-OFF system) between the button 12 and the intermediate element 8, it should be noted that the stop 13 can be an axial rib on the button 12 which, when the button is in the said dispensing position (see FIG. 5), is aligned with a guide 18 provided on the said intermediate element 8, which guides the stop 13 during the axial stroke of the button; optionally, the guide 18 has a stop 18A for the stop 13 when the button 12 is at the stroke limit thereof.

Figure 10:
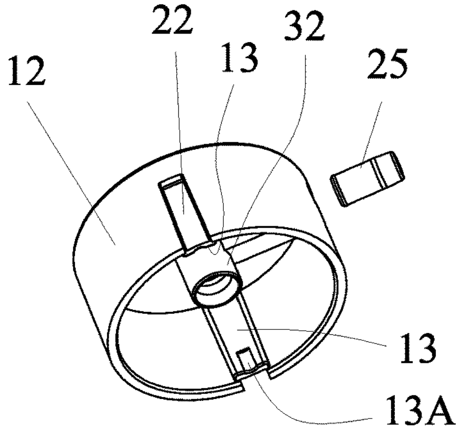

Advantageously, as is visible in FIG. 10, the axial recess 22 is featured on the external surface of the button 12 in the same position as the said stop 13 on the internal surface of the button 12.

Figure 4:
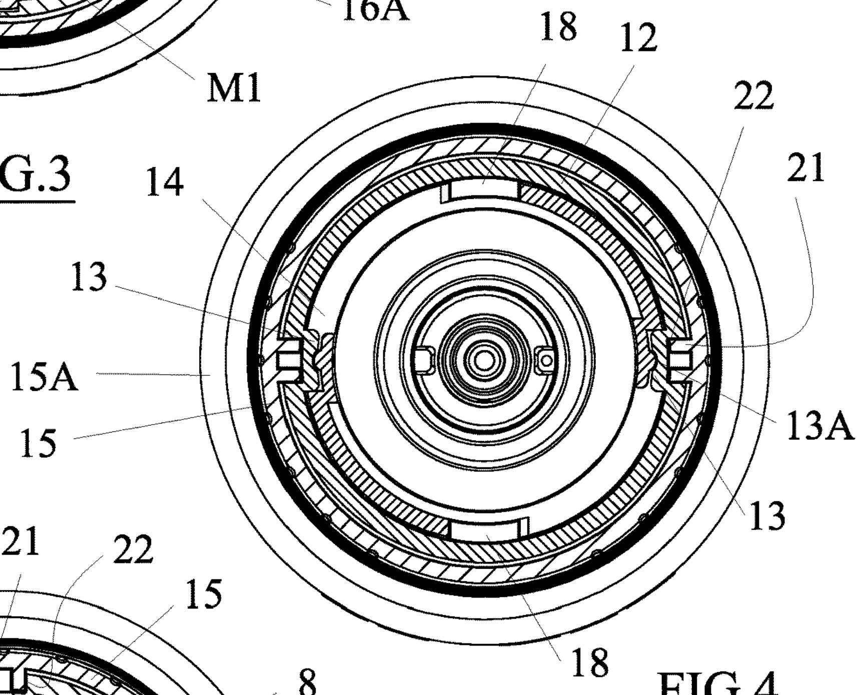
FIG. 4 is a section view taken along line IV-IV in FIG. 1.

To conclude the description, and as can be seen in FIG. 9, but also in FIGS. 3 and 4, an elastic tab 23 on the intermediate element 8 can cooperate with the stop 13, in order to keep the button 12 in the locked position.

The tab 23 can feature a tooth 23A which engages in a depression or recess 13A in the said stop, precisely to stabilise the position thereof.

It must be underlined that the parts of the device can be made of various materials.

For example, the external container 2 can preferably be made of blown glass. The said container can have a circular, elliptical, square, or rectangular conformation (plan view) or even a shape that varies axially, for example circular at the base and square near the neck, etc.

The collar 5, the dispensing button 12, and the ring nut 15 and possibly the nozzle 25 are preferably made by moulding a plastic material (each one as a single piece).

Some plastic materials that can be used include one or more of the following: PP, PET, PETG, HDPE, PE, PA, PBT.

As mentioned earlier, the covering 15A for the ring nut 15 can be made of a metal or plastic material, for example of aluminium or PP, PET, PETG, HDPE, PE, PA, PBT, and may also be finely decorated.

The pump P can be of the conventional type, and is preferably airless if coupled with the deformable bag D.

The operation envisaged in the invention is apparent from the description above and is essentially as follows.

Figure 1:
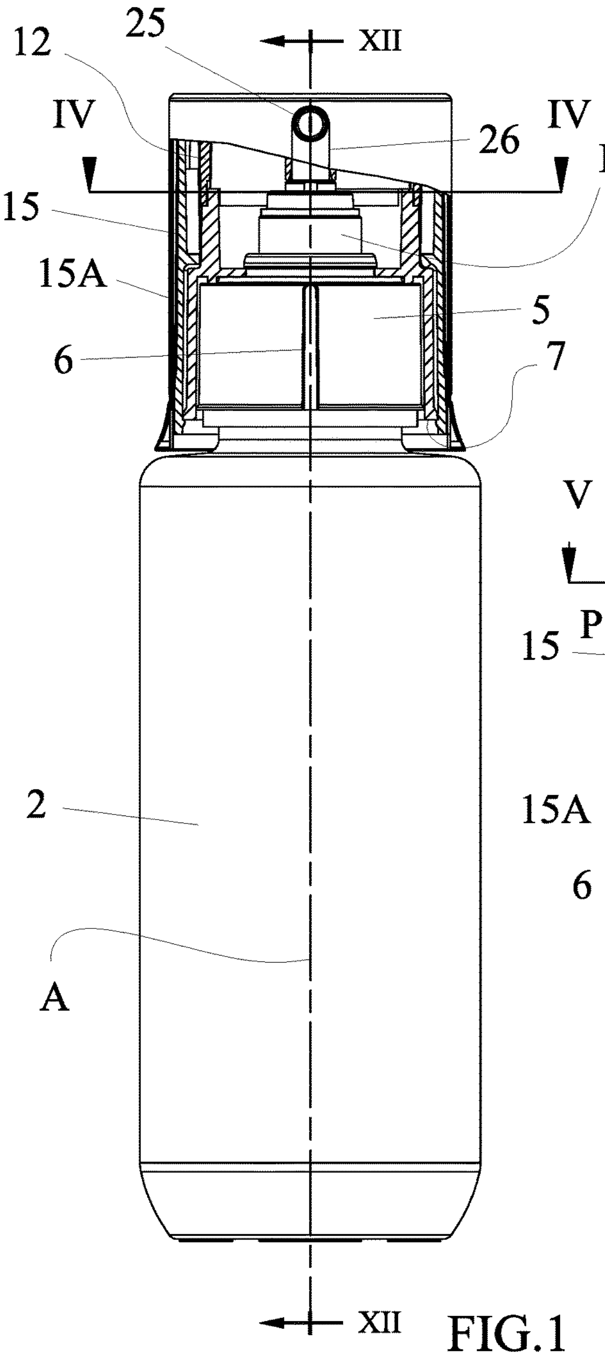
FIG. 1 is a front partial section view of a device according to the invention in a closed position.
Figure 2:
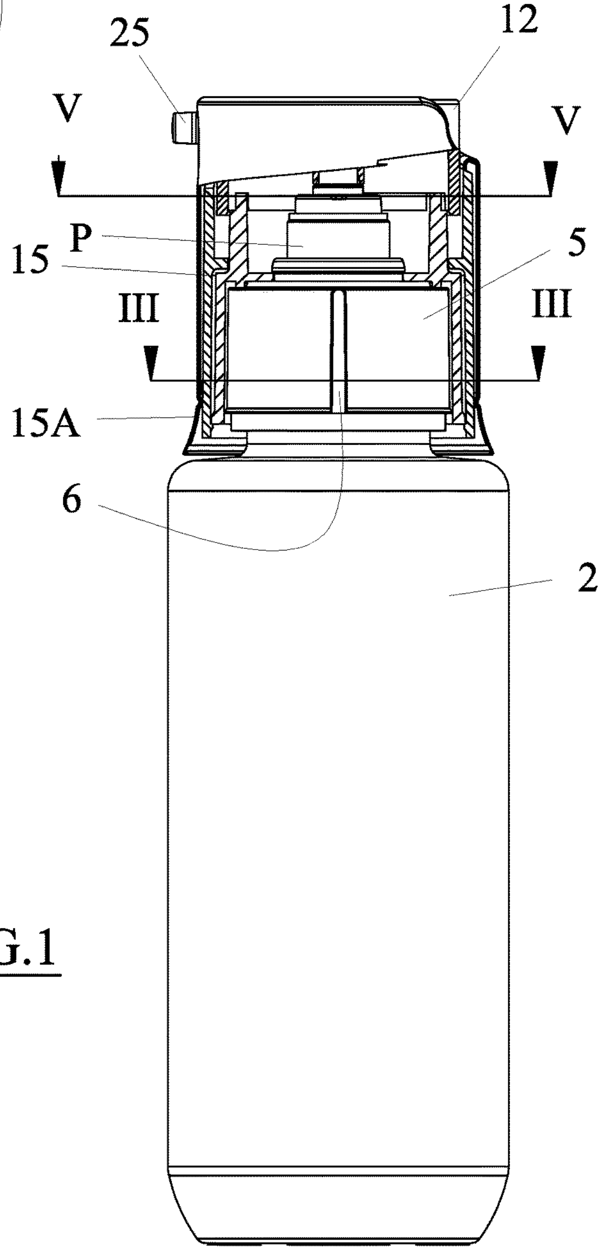
FIG. 2 is the view of the device in FIG. 1 in a dispensing position.

Prior to use, the device is in the position shown in FIG. 1. In this position, the stroke of the button 12 (accessible from the top of the ring nut 15, 15A and partially through the lowered portion 27 of the said ring nut) is prevented by the stop 13, which abuts the surface 14 of the intermediate element 8.

The 'closed' position is kept stable by the tabs 23 and by the teeth 23A, which engage with the recess 13A.

Figure 5:
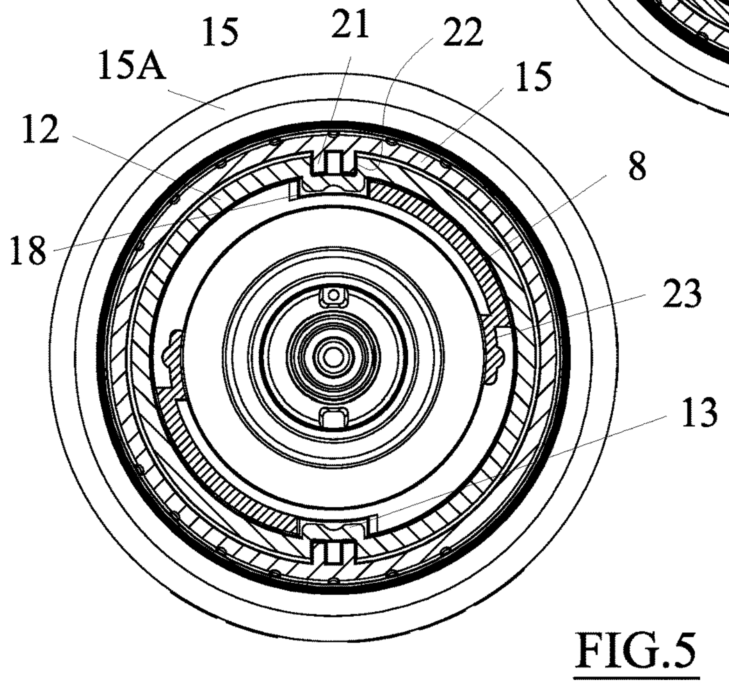
FIG. 5 is a sectional view taken along line V-V in FIG. 2.

Obviously, as can be seen in FIGS. 4 and 5, two diametrically opposing stops 13 may be envisaged on the dispensing button 12, and consequently two surfaces 14, two flaps 23 (and so on) are envisaged on the intermediate element 8.

Turning the ring nut 15, or rather the covering 15A integral with the ring nut 15 (in the example, anticlockwise), results in the button 12 being rotated by the further axial rib 21 engaged with the recess 22 in the said button. Rotation continues until the button is in the dispensing position, i.e. the position shown in FIG. 5.

In this position the stops 13 are aligned with the guides 18, permitting axial translation (free stroke) of the button 12 for dispensing. The said translation (transmitted to the stem P1 of the pump P) allows dispensing of the substance S contained in the deformable bag D through the nozzle 25 in a known manner.

It should be emphasised that the ring nut 15, or at least the covering 15A thereof, completely hide the intermediate element 8, the collar 5, and the other "non-aesthetically pleasing" parts of the device 1, such as for example the recesses 22 in the button. Only a part of the dispensing button 12 and the nozzle 25 remains accessible (and visible) (through the window 26).

The alignment of the various parts of the device (in particular the nozzle 25, the lower portion 27 of the ring nut and the covering 15A) with respect to the external container 2 is guaranteed by the systems for the mutual or reciprocal alignment of the various components, as described above.

Therefore, the container 2 can also have prints, reliefs, or preferential zones with respect to which the nozzle 25 can be aligned by means of the arrangements described above.

The device is therefore extremely pleasing to the eye and conveys a sense of great overall quality to the end user.

Furthermore, the alignment systems envisaged minimise rejects generated by incorrect assembly of the device.

Furthermore, provision of the dispenser locking and unlocking system protects the product from accidental dispensing, even during transport and in the absence of a protective cap.

Various embodiments of the innovation have been disclosed herein, but further embodiments may also be conceived using the same innovative concept.

The invention claimed is:

1. A device (1) for dispensing a fluid substance, comprising an external container (2) equipped with a collar (5) and an intermediate element (8) fixed to the collar (5), the collar further comprising an opening, wherein a disposable bag is inserted into the opening of the collar, first torsional alignment means (6, 6A) being present between the intermediate element (8) and the collar (5), the intermediate element (8) having an opening (9) cooperating with a flange (10) of a pump (P) for fixing the pump to the collar (5), the pump (P) having a stem (P1) tightly associated to a dispensing button (12), the dispensing button (12) being rotatably associated to the intermediate element (8) in a movable way between a locking position, in which at least one stop (13) of the button (12) strikes a surface (14) of the intermediate element (8), to prevent an axial translation of the button (12), and a dispensing position in which allows an axial movement of the button (12) for dispensing a fluid substance contained in the external container no (2), the device (1) further comprising a ring nut (15) torsionally coupled to the push button (12) to move the push button (12) between the locking position and the dispensing position, the ring nut (15) hiding from view at least part of a lateral surface of said push button (12) and of said intermediate element (8), wherein the collar (5) is separate from the container (2).

2. The device (1) according to claim 1, wherein the outer container (2) is made of glass, and has a neck (3) equipped with a thread (4), the collar (5) having a counter-thread (16), the thread (4) and the counter-thread (16) being configured to allow a snap stop position, which determines a unique alignment between the collar (5) and the external container (2).

3. The device according to claim 2, wherein said thread (4) and said counter-thread (16) are of the type with single principle, and one of said counter-thread (16) and said thread (4) has a detached portion (16A) of the thread that defines said end-of-stroke position when it is inserted in a seat (4A) formed in the other between said thread (4) and counter-thread (16).

4. The device (1) according to claim 1, wherein said ring nut (15) is snap fastened to the intermediate element (8).

5. The device according to claim 1, wherein the ring nut (15) has a coating (15A) in metallic material or with a metallic finish.

6. The device according to claim 1, wherein said stop (13) is an axial rib of the button (12) and which, when the button is in said dispensing position, is aligned with a guide (18) formed in said intermediate element (8) which guides the stop (13) during the stroke of the button, the guide presenting a stop (18A) to stop the button (12) when at its end of stroke position.

7. The device according to claim 1, wherein the ring nut (15) is torsionally coupled to the button (12) by means of at least one further axial rib (21) which cooperates with at least one axial recess (22) of the button.

8. The device according to claim 6, wherein an axial recess (22) is made on the external surface of the button, in a position corresponding to the position of the stop (13) on an internal surface of the button (12).

9. The device according to claim 1, wherein said stop (13) cooperates with an elastic tab (23) of the intermediate element (8) when the button is in the locked position, the tab (23) providing a tooth (23A) which engages a depression (13A) of said stop.

10. The device according to claim 1, wherein said dispenser button (12) has a protruding nozzle (25), the ring nut (15) presenting a window (26) inside which said nozzle (25) is positioned.

11. The device according to claim 1, wherein said ring nut (15) has a free end equipped with a lowered portion (27) which makes accessible a side part of said button (12).

12. The device according to claim 1, wherein the deformable bag comprises a flange.

13. The device according to claim 12, wherein the flange of the pump and the flange of the deformable bag are positioned between the collar and the intermediate element.

* * * * *